United States Patent [19]

Grandia

[11] 4,132,300
[45] Jan. 2, 1979

[54] DISCONNECT MECHANISM FOR COMPRESSOR DRIVE

[75] Inventor: William M. Grandia, Jacobus, Pa.

[73] Assignee: Borg-Warner Corporation, Chicago, Ill.

[21] Appl. No.: 749,941

[22] Filed: Dec. 13, 1976

[51] Int. Cl.² .......................... F16D 9/00; F16D 43/25
[52] U.S. Cl. .................................. 192/82 T; 64/28 R; 74/230.17 T; 403/32
[58] Field of Search ..................... 192/82 T; 64/28 R; 74/230.17 T; 403/28, 32

[56] References Cited

U.S. PATENT DOCUMENTS

| | | | |
|---|---|---|---|
| 2,655,015 | 10/1953 | Linder | 192/82 T |
| 3,064,454 | 11/1962 | Sharples | 192/82 T |
| 3,193,068 | 7/1965 | Greve et al. | 192/82 T |
| 3,675,444 | 7/1972 | Whipple | 64/28 R |
| 3,889,789 | 6/1975 | Boehringer | 192/82 T |

Primary Examiner—Allan D. Herrmann
Attorney, Agent, or Firm—Thomas B. Hunter

[57] ABSTRACT

An improved disconnect or power stop mechanism adapted for use in a refrigerant compressor drive system. A soldered connection is operative to initiate a disconnect or declutching action between the driving and driven members if the system should happen to lose its charge of refrigerant or otherwise get into an unsafe, high temperature condition.

7 Claims, 4 Drawing Figures

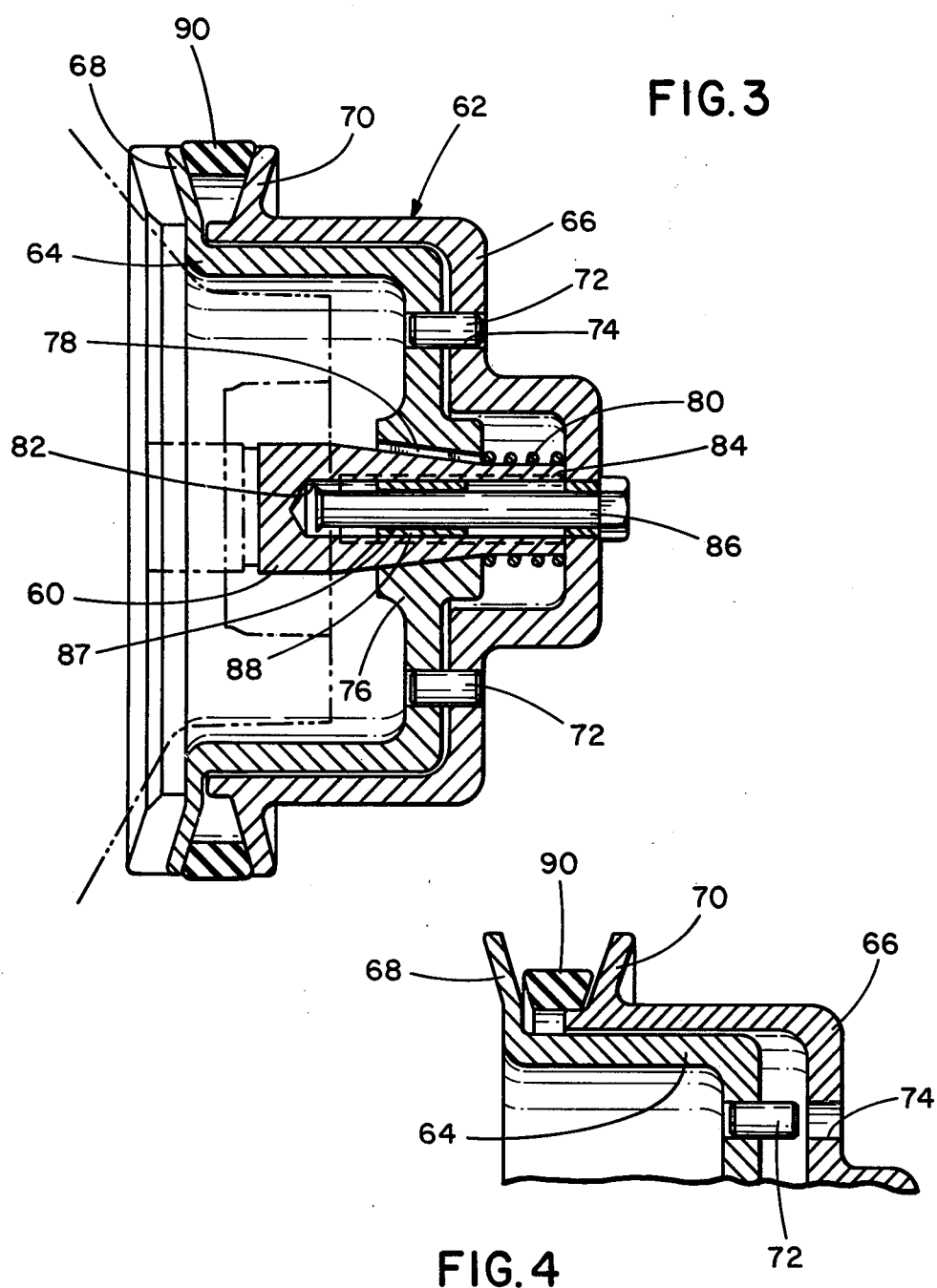

DISCONNECT MECHANISM FOR COMPRESSOR DRIVE

BACKGROUND OF THE INVENTION

1. Field of the Invention

Disconnect or power stop mechanism adapted to de-clutch the driving and driven members of a refrigerant compressor in the event of an unsafe temperature condition, caused, for example, by loss of refrigerant from the system.

SUMMARY OF THE INVENTION

This invention relates generally to drive means for a refrigerant compressor or the like and more particularly to means for disconnecting the compressor drive shaft from the driving pulley, or other type of drive means, in the event the compressor should become overheated, such as by loss of refrigerant or otherwise.

In the typical air conditioning system designed for use in an automotive application, an electromagnetic clutch is interposed between the drive pulley, which is driven from the automobile engine off one of the accessory drive belts, and the compressor drive shaft. The clutch is actuated and deactuated in response to a signal such as one derived from the air temperature within the automotive passenger compartment. This type of system has a number of disadvantages in that when the clutch is engaged it causes immediate drag on the engine which is particularly annoying at idle conditions since it may cause the engine to stall unless the idle is properly adjusted.

One improvement on the clutch actuated system described above is a system in which the capacity of the compressor is modulated from virtually zero to full capacity over a continuous range of compressor output. In this case, the clutch can be eliminated and the compressor driven at all times while the engine is running.

When the compressor is driven continuously, it can be severely damaged when insufficient lubricant is present in the system or if the system should lose a substantial portion of its refrigerant charge. In the absence of some protective mechanism, the compressor will then overheat, possibly causing seizure of the moving parts.

In the present invention, means are provided for disconnecting or de-clutching the driving and driven members of the compressor if the compressor should reach an unsafe operating temperature. The system is designed so that the compressor may not be repaired on the spot by an inexperienced owner or operator; but will most likely be returned for service by a qualified mechanic who will be able to identify the cause of the overheating condition and reassemble the drive mechanism so that the compressor may be operated safely after the cause of the overheating is remedied.

More specifically, this takes the form of a disconnect mechanism including a temperature dependent bond, such as solder, between two elements which will cause disengagement and permit the drive pulley member to free-wheel on a bearing surface on the shaft.

DESCRIPTION OF THE DRAWINGS

FIG. 3 is a cross section view of a modified drive disconnect mechanism; and

FIG. 4 is a partial cross section view showing the mechanism in the disengaged position.

DETAILED DESCRIPTION OF A PREFERRED EMBODIMENT

Figure 1:
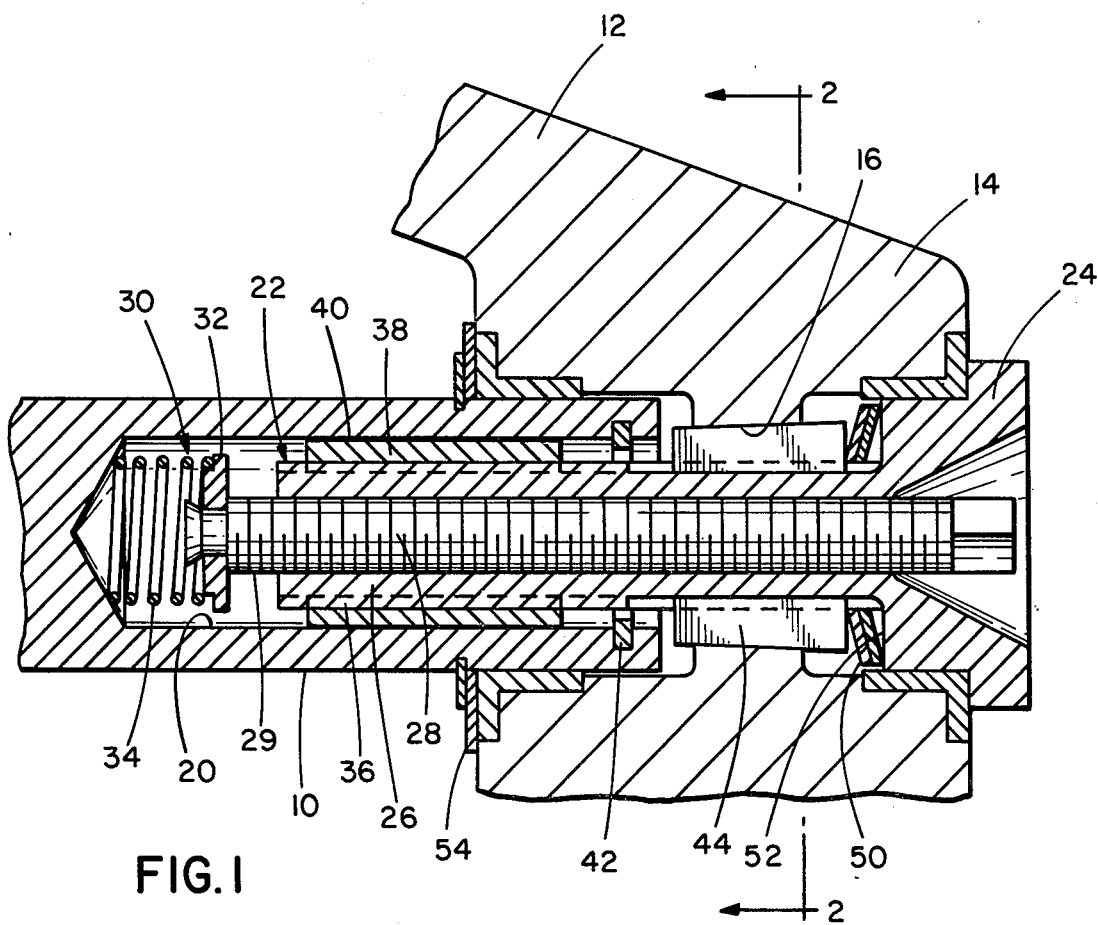
FIG. 1 is a partial cross section view of a drive pulley and compressor shaft which incorporates the disconnect feature forming the subject of the present invention.
Figure 2:
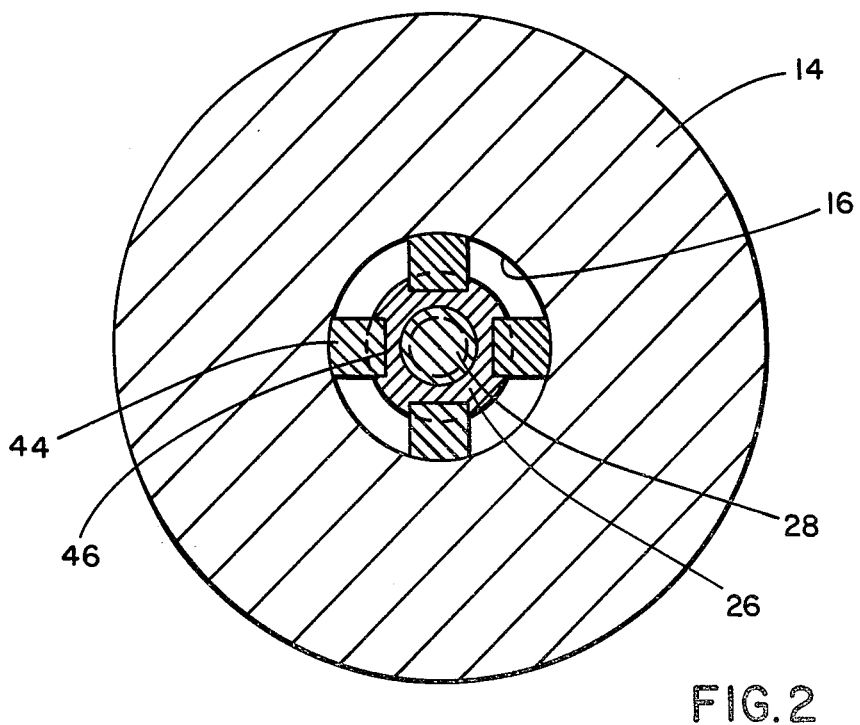
FIG. 2 is a cross sectional view taken along the plane of line 2—2 of FIG. 1.

Referring to FIGS. 1 and 2, drive shaft 10 is adapted to be connected to the compressing mechanism (not shown) of any type driven by a rotary power input. In the context of this invention, the compressor drive shaft 10 will be referred to as the driven shaft since it is an intermediate element in the drive line between the load and the pulley member 12. Pulley member 12 is typically driven by the automobile engine from one of the accessory V-belts and includes an inner hub section 14 and a tapered boss 16 for a purpose to be described below.

The driven shaft 10 includes an axially extending blind bore 20 for reception of an actuator assembly 22 which includes a head portion 24, a hollow shank 26 receiving set screw 28 and a spring assembly 30. The set screw is threaded (at 29) inside the hollow shank portion and the spring assembly includes a spring cup 32 and a helical spring 34 engaging the bottom portion of the blind bore 20. The shank portion is externally threaded at 36 into a hollow sleeve member 38 which in turn is soldered to the inner wall of bore 20. The soldered layer, shown in greatly exaggerated thickness, is indicated at 40.

Toward the right hand end of shaft 10 is an annular retaining ring 42 set in a corresponding groove formed in the shaft. Between the retaining ring 42 and the head portion 24 are a plurality of keys 44 which are received in corresponding slots 46 on the OD of the shank portion and are adapted to engage the tapered surface of boss 16. The keys are urged to the left (as shown in FIG. 1), in wedging engagement with the tapered surface, by one or more Belleville springs 50 which rest against a flat surface 52 cut on the underside of the head of fill piece 22.

In the assembly of the device described above, the threaded sleeve 38 is located on the side of the bore and soldered at 40 to the shaft. Retaining ring 42 is placed in position and the hub fitted over the end of the shaft and moved to the left against a retaining washer 54. Next, the actuator assembly 22, containing the spring assembly 30 and set screw 28, is then screwed into the internal threads of sleeve member 38. The tension on the spring 34 is adjusted by the turning of set screw 28.

Operation

In the event the compressor becomes overheated for some reason, such as by loss of refrigerant charge or lubricant, the drive shaft will become quite hot and melt the soldered layer 40. When this occurs the entire assembly including the assembly 22 and sleeve member 38 will immediately move to the right under the force of spring 34 until it engages the retaining ring 42. This will cause the keys 44 to move out of engagement with the tapered section of the boss 16 releasing the driving connection and permitting free rotation of the pulley.

Modification

In the embodiment shown in FIGS. 3 and 4, the same principle of operation is used, but in a somewhat different form. The driven shaft 60 supports a pulley assembly 62 which includes a fixed member 64 and an axially movable member 66. At the periphery, the flange 68 on the fixed member forms one side of a sheave for engagement with a V-belt drive. A flange 70 on the movable member forms the opposite side of said sheave.

The fixed member includes a series of circumferentially spaced lugs 72 which are adapted to engage corresponding apertures 74 on the movable member when the assembly is in its drive position. The hub 76 of the fixed member 64 is keyed or otherwise connected at 78 to the shaft 60 and there is a resilient means or spring 80 engaging a central portion of the movable member thereby tending to urge the fixed and movable members apart.

The driven shaft 60 is formed with an axially extending blind bore 82 which is internally threaded at 84. A pin 86 is soldered at 87 to a sleeve member 88 which has external threads engageable with the threads in said bore. When the unit is assembled, the fixed member is splined to the shaft and then the spring is positioned in place on the O.D. of the shaft. The movable member is then slipped into place and adjusted so that the lugs 72 project through the corresponding openings 74 in the movable member. The pin 86, which has been soldered in sleeve 88, is then inserted and the sleeve threaded into the bore 82, locking the movable member with respect to the fixed member and compressing the spring 80.

When the temperature becomes high enough to melt the soldered layer 87 between the pin 86 and the sleeve 88, this will release the bond and the spring 80 will drive the movable member to the right (as viewed in FIG. 3). At this point the fixed and movable members will be in the respective positions shown in FIG. 4 with the lugs released from the apertures and with the V-belt 90 moving radially inwardly to release the tension and permit the belt to slip.

While this invention has been described in connection with certain specific embodiments thereof, it is to be understood that this is by way of illustration and not by way of limitation; and the scope of the appended claims should be construed as broadly as the prior art will permit.

What is claimed is:

1. A disconnect mechanism between a rotary driving member and a rotary driven member comprising: a hub member associated with said driving member; a shaft associated with said driven member, said shaft having an axial bore; means for interconnecting said hub and said shaft including first and second members bonded to each other by means of a solder material which will unbond at some predetermined temperature; said means for interconnecting said hub and shaft further including a rod-like element associated with and driven by said hub member extending into said bore and an annular sleeve member surrounding said rod-like element and positioned between said rod-like element and said shaft in said axial bore, said solder material securing said sleeve member to one or the other of said shaft and said rod-like element; resilient means biasing one of said first and second members in a direction tending to effect disengagement of drive, said solder material holding said spring under compression below said predetermined temperature, but releasing above said predetermined temperature to disengage said hub member and said shaft.

2. Apparatus as defined in claim 1 wherein said sleeve member is solder bonded to said shaft and mechanically secured to said rod-like member.

3. Apparatus as defined in claim 1 wherein said sleeve member is solder bonded to said rod-like member and mechanically secured to said shaft.

4. Apparatus as defined in claim 3 including a split pulley driving said hub member, said pulley having an axially fixed component secured to said shaft and an axially moveable component capable of assuming a first position wherein said axially fixed and moveable components are positively locked and a second position wherein said axially fixed and moveable components are disengaged from each other.

5. Apparatus as defined in claim 4 wherein one of said axially fixed and moveable components includes at least one axially extending pin and the other said component includes means defining an aperture into which said pin is received in said first position.

6. Apparatus as defined in claim 5 wherein each of said axially fixed and moveable components contains a flange cooperating with the other flange to form a sheave, adapted to be driven by a V-belt, the separation of said flanges decreasing the effective diameter of said sheave to slacken tension on said V-belt.

7. A disconnect device interposed between a drive pulley and a driven shaft comprising: a hub member associated with said drive pulley; means defining an axially extending bore in said shaft; bearing means for mounting said hub member on said shaft; a sleeve member positioned in said bore and soldered to said shaft, said sleeve being threaded internally, and releasable at the soldered connection upon reaching a predetermined temperature at which the solder melts and unbonds, an elongated member having a head portion and a shank portion threaded into said sleeve member, a set screw extending through said shank portion and a spring engaged by said set screw, the compression of said spring being adjustable by selective positioning of said set screw; at least one key positively engaged with said shank portion and frictionally engaged with said hub member, whereby upon release of the soldered connection between said sleeve member and said shaft, said spring urges said shank portion in a direction to disengage said key from said hub member.

* * * * *